US 8,244,740 B2

(12) United States Patent
Gruenhagen et al.

(10) Patent No.: US 8,244,740 B2
(45) Date of Patent: Aug. 14, 2012

(54) PROVIDING SUGGESTED SITES ASSOCIATED WITH TARGET SITES

(75) Inventors: Richard J. Gruenhagen, Woodinville, WA (US); Andrew P. Oakley, Seattle, WA (US); Maxim V. Stepin, Redmond, WA (US); Christopher A. Meyers, Redmond, WA (US); Srinath R. Aaleti, Redmond, WA (US); Jason A. Bolla, Bellevue, WA (US); Nikolay A. Glushnev, Redmond, WA (US)

(73) Assignee: Microsoft Corporation, Remond, WA (US)

( * ) Notice: Subject to any disclaimer, the term of this patent is extended or adjusted under 35 U.S.C. 154(b) by 844 days.

(21) Appl. No.: 12/324,598

(22) Filed: Nov. 26, 2008

(65) Prior Publication Data

US 2010/0131441 A1 May 27, 2010

(51) Int. Cl.
    *G06F 17/30* (2006.01)
(52) U.S. Cl. .......................... 707/751; 706/45
(58) Field of Classification Search .............. 707/751; 706/45
    See application file for complete search history.

(56) References Cited

U.S. PATENT DOCUMENTS

| | | | |
|---|---|---|---|
| 6,385,175 | B1 | 5/2002 | Dove |
| 7,698,269 | B2 * | 4/2010 | Zhou et al. ............. 707/999.006 |
| 2002/0198882 | A1 | 12/2002 | Linden |
| 2005/0160360 | A1 | 7/2005 | Nadamoto |
| 2006/0004772 | A1 * | 1/2006 | Hagan et al. .................... 707/10 |
| 2006/0059225 | A1 * | 3/2006 | Stonehocker et al. ........ 709/202 |
| 2006/0069699 | A1 | 3/2006 | Smadja |
| 2007/0074125 | A1 * | 3/2007 | Platt et al. ..................... 715/760 |
| 2007/0208729 | A1 | 9/2007 | Martino |
| 2008/0114709 | A1 * | 5/2008 | Dixon et al. .................... 706/13 |
| 2008/0126176 | A1 | 5/2008 | Iguchi |
| 2008/0140674 | A1 | 6/2008 | Ishikawa |
| 2008/0288492 | A1 * | 11/2008 | Gemmell et al. ................ 707/7 |
| 2009/0125827 | A1 * | 5/2009 | Zeigler et al. ................ 715/765 |

FOREIGN PATENT DOCUMENTS

| | | |
|---|---|---|
| JP | 2003030231 A | 1/2003 |
| JP | 2003085202 A | 3/2003 |
| KR | 1020010092922 A | 10/2001 |
| WO | 2004109532 A1 | 12/2004 |

OTHER PUBLICATIONS

PCT Search Report, mailed Jun. 23, 2010, pp. 1-11. Extended European Search Report, completed Mar. 6, 2012, 9 pp.

(Continued)

*Primary Examiner* — James Trujillo
*Assistant Examiner* — Amresh Singh
(74) *Attorney, Agent, or Firm* — Shook, Hardy & Bacon L.L.P.

(57) ABSTRACT

Systems, methods, and computer storage media having computer-executable instructions embodied thereon that facilitate providing suggested sites in accordance with target sites are provided. Web-browsed data is locally stored on a user device and uploaded to a suggestion engine. Additional web-browsed data is communicated to the suggestion engine via a suggested site request that provides a request for suggested sites related to a target site. In embodiments, the web-browsed data contained in the suggested site request includes data not previously uploaded to the suggestion engine. The suggestion engine utilizes the web-browsed data uploaded to the suggestion engine and the web-browsed data communicated via the suggested site request to provide suggested sites in association with the target site.

17 Claims, 7 Drawing Sheets

OTHER PUBLICATIONS

Fu, "Mining Navigation History for Recommendation," 2000 International Conference on Intelligent User Interfaces, IUI 2000, New Orleans, LA, Jan. 9-12, 2000, XP-001168645, ISBN: 978-1-58113-134-5, pp. 106-112.

Lieberman, "Letizia: An Agent That Assists Web Browsing," AAAI Technical Report FS-95-03, 1995, pp. 97-102.

Pakalski, "Internet Explorer 8 kommt mit private-Browsing-Modus," Aug. 16, 2008, pp. 1-3.

Tingshao Zhu et al., "Learning a Model of a Web User's Interests," Dept. of Computing Science, Univ. of Alberta, Canada, http://www.cs.ualberta.ca/--tszhu/paper/um2203.pdf, pp. 1-10.

Fabrizio Silvestri et al., "On-line Generation of Suggestions for Web Users," http://hpc.isti.cnr.it/--palmeri/articles/suggest2.pdf, pp. 1-6, Pub.date:2004.

\* cited by examiner

PROVIDING SUGGESTED SITES ASSOCIATED WITH TARGET SITES

BACKGROUND

When a user visits a website, the user is often interested in other similar or related websites. Oftentimes, websites related or similar to a website currently being viewed are unknown to a user. As such, generally, to identify similar or related websites that might be of interest to a user, the user enters a query into a search engine to obtain search results that might provide other websites of interest to the user. In many cases, however, a user may not know query terms to use to find websites related or similar to a specific website. Accordingly, it can be a difficult task to identify other related websites, particularly when such websites are either less popular or otherwise have limited viewer-history associated therewith.

SUMMARY

Embodiments of the present invention relate to systems and methods that facilitate providing suggested sites in association with target sites. A suggested site is a website or web page that is suggested or recommended based on its relatedness or similarity to another particular site. Browsing history associated with a user's or a group of users' browsing activities is used to identify suggested sites to provide to a user. Using an aggregated browsing history of a user or a group of users is advantageous as such data can better anticipate sites that might be of interest to a user. Accordingly, browsing history associated with a user can be captured and periodically uploaded to a suggestion engine that accumulates browsing data. Additionally, in order for the suggestion engine to provide up-to-date suggested sites, a user's recent browsing history, or a portion thereof, can be communicated to the suggestion engine via a request for suggested sites. Embodiments of the present invention further relate to maintaining user privacy while providing suggested sites in association with target sites.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
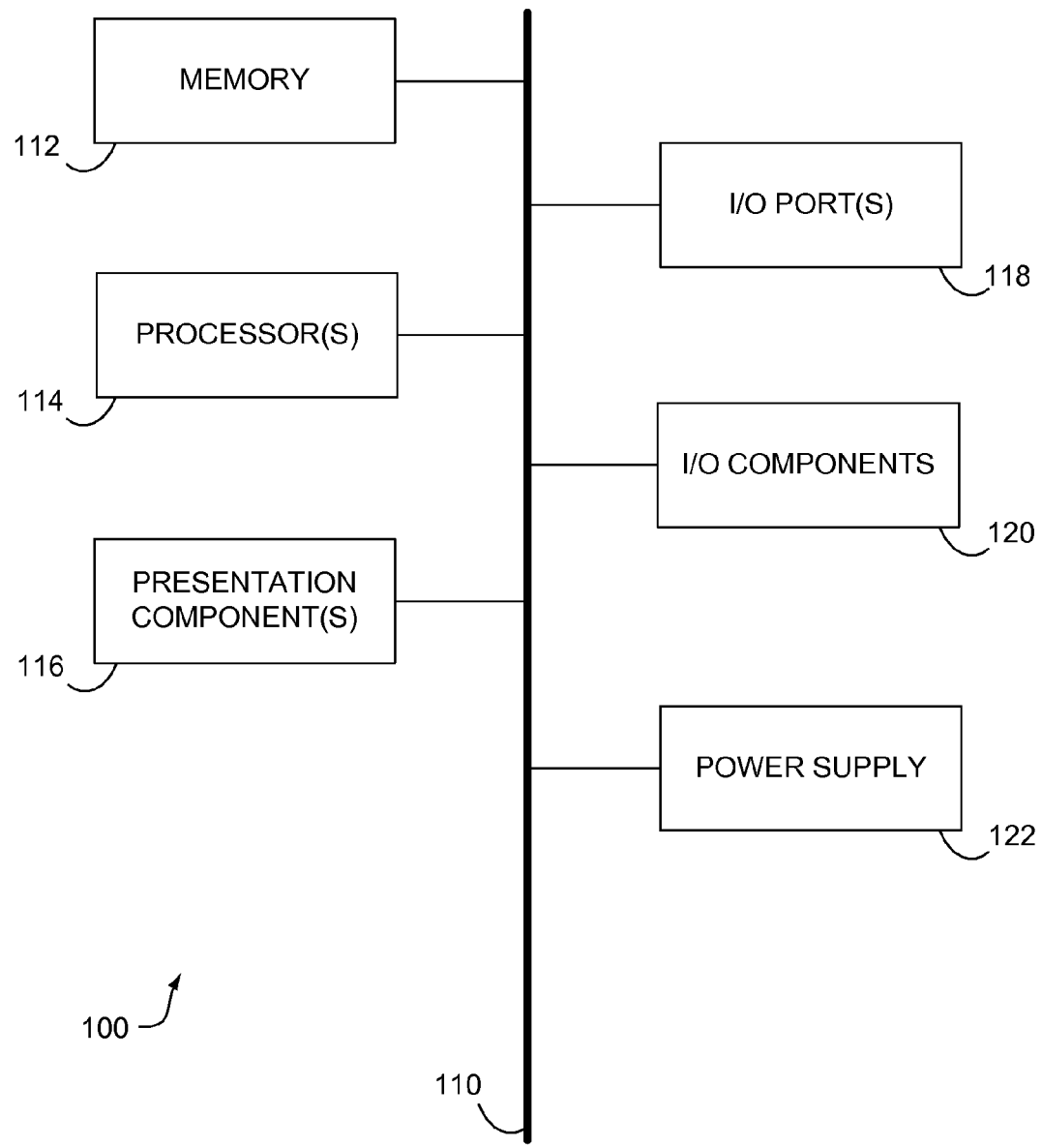
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to systems, methods, and computer storage media having computer-executable instructions embodied thereon that facilitate providing suggested sites in association with target sites. Suggested sites are websites or web pages that are suggested or recommended based on their relatedness or similarity to a target site. Using browsing history of a user or a group of users to provide suggested sites is advantageous in that more sites of interest to a user might be provided. Accordingly, browsing history associated with a user can be captured and periodically uploaded to a suggestion engine that accumulates browsing data. Additionally, in order for the suggestion engine to provide up-to-date suggested sites, a user's recent browsing history, or a portion thereof, can be communicated to the suggestion engine via a request for suggested sites. Further, to maintain user privacy, an indication of data that is intended to be private is communicated to the suggestion engine so that the use of such data is reduced or eliminated. Such user privacy can be accomplished using any protocol, such as HTTPS, that supports privacy preservation and data integrity.

Accordingly, in one aspect, the present invention is directed to one or more computer storage media having computer-executable instructions embodied thereon for performing a method that facilitates providing suggested sites in association with target sites. The method includes obtaining web-browsed data associated with web browsing activities of a user. The web-browsed data includes a site identifier that identifies a web-browsed website or webpage. The web-browsed data is stored in association with a user identifier that identifies the user or user device corresponding with the web browsing activities. The stored web-browsed data is communicated to a suggestion engine that provides suggested sites in association with target sites. The web-browsed data is used to determine suggested sites for each target site.

In another aspect, the present invention is directed to a computerized method that facilitates providing suggested sites in association with target sites. The method includes receiving web-browsed data associated with web browsing activities of a user. The web-browsed data includes site identifiers that identifies web-browsed websites or webpages. The web-browsed data is stored in a data store in association with the user. Recent web-browsed data associated with the user is received via a suggested site request that requests suggested sites. The recent web-browsed data includes a target site. The received target site and the received web-browsed data are used to identify the suggested sites in association with the target site, wherein the suggested sites are related or similar to the corresponding target site. The suggested sites are presented in association with the corresponding target site.

In yet another aspect, the present invention is directed to one or more computer storage media having computer-executable instructions embodied thereon that facilitates providing suggested sites in association with target sites. The method includes receiving web-browsed data associated with web browsing activities of a group of web browser users. The web-browsed data includes site identifiers that identify web-browsed website or webpages. The web-browsed data is stored in a data store in association with a user identifier. A suggested site request is received, the suggested site request being communicated from a user device in response to a user providing an indication of a desire to view suggested sites. The suggested site request includes recent web-browsed data associated with the user, wherein the recent web-browsed data includes a user identifier associated with the user or the user device, target sites comprising recently viewed sites, and an indication of recently deleted sites. Suggested sites that correspond with each of the target sites are identified using the web-browsed data stored in the data store and the recent web-browsed data communicated in the suggested site request. The suggested sites are related or similar to the corresponding target site. The suggested sites are presented to the user in association with the corresponding target site.

Having briefly described an overview of the present invention, an exemplary operating environment in which various aspects of the present invention may be implemented is described below in order to provide a general context for various aspects of the present invention. Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-usable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
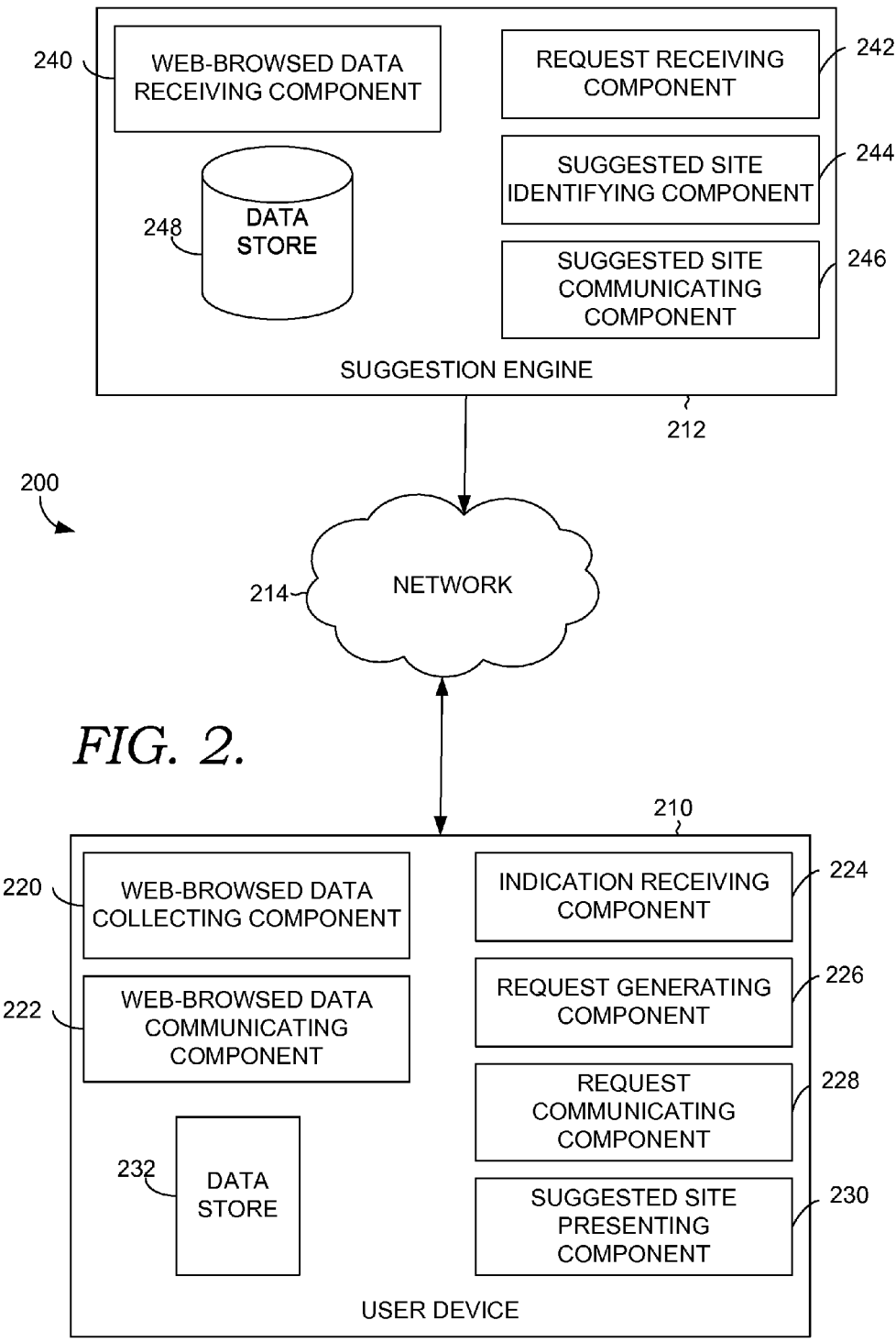
FIG. 2 is a block diagram of an exemplary system in which embodiments of the invention may be employed.

Referring now to FIG. 2, a block diagram is provided illustrating a system 200 that facilitates providing suggested sites in association with target sites, in accordance with an embodiment of the present invention. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 200 generally includes a user device 210 and a suggestion engine 212, in communication with one another via a network 214. The network 214 may include, without limitation, one or more local area networks (LANs) and/or wide area networks (WANs). Such networking environments are commonplace in offices, enterprise-wide computing networks, intranets, and the Internet. Accordingly, the network 214 is not further described herein.

The user device 210 and the suggestion engine 212 may comprise any type of computing device, such as, for example, computing device 100 described above with reference to FIG. 1. By way of example only and not limitation, the user device 210 and the suggestion engine 212 may be a personal computer, desktop computer, laptop computer, handheld device, mobile handset, consumer electronic device, or the like. It should be noted, however, that the present invention is not limited to implementation on such computing devices, but may be implemented on any of a variety of different types of computing devices within the scope of the embodiments hereof.

It should be understood that any number of user devices, suggestion engines, and networks may be employed within the system 200 within the scope of embodiments of the present invention. Additionally, although many other components of the system 200 are not shown, those of ordinary skill in the art will appreciate that such components and their interconnections are well known. Accordingly, additional details concerning components not shown in the system 200 are not further disclosed herein.

As previously mentioned, embodiments of the present invention relate to systems and methods that facilitate providing suggested sites in association with target sites. A suggested site refers to a website or web page that is suggested or recommended based on its relatedness or similarity to a target site. That is, a suggested site is a site related or similar to a target site that might be of interest to a user. A suggested site might be related or similar to a target site based on, for example, content, features, subject matter, search engine results, user behavior, combinations thereof, and the like. For instance, assume a news website is a target site for which suggested sites are desired. In such a case, other news websites might be related to the target site and, thus, provided as suggested sites. Accordingly, a user can be informed of other sites (i.e., suggested sites) that may be of interest but unknown to the user. A target site refers to a website or webpage for which suggested sites are desired or intended. For example, a target site might be a site currently being viewed, a site most recently viewed, a site most commonly viewed, or the like. The term "site" is generally used hereinafter and is intended to include a website and/or a webpage. By way of example only, assume a user is viewing website A and would like to be provided with other sites that provide similar content, features, or subject matter. In such a case, website B, website C, and website D are identified as suggested sites and presented to the user in association with the target site (i.e., website A).

As shown in FIG. 2, the user device 210 of system 200 includes a web-browsed data obtaining component 220, a web-browsed data communicating component 222, an indication receiving component 224, a request generating component 226, a request communicating component 228, a suggested site presenting component 230, and a data store 232. In some embodiments, one or ore of the illustrated components 220, 222, 224, 226, 228, 230, and 232 may be implemented as stand-alone applications. In other embodiments, one or more of the illustrated components 220, 222, 224, 226, 228, 230, and 232 may be integrated into the operating system of the user device 210 and/or the suggestion engine 212 or integrated with the web browser of the user device 210. It will be understood by those of ordinary skill in the art that the components 220, 222, 224, 226, 228, 230, and 232 illustrated in FIG. 2 are exemplary in nature and in number and should not be construed as limiting. Any number of components may be employed to achieve the desired functionality within the scope of embodiments of the present invention.

The web-browsed data obtaining component 220 is configured to obtain web-browsed data associated with a user or a user device. As a user browses the web, the web-browsed data obtaining component 220 obtains web-browsed data. That is, as a user navigates to or performs an action within a website or web page, web-browsed data can be intercepted and obtained. In this regard, web-browsed data is obtained as a result of web browsing activities (e.g., navigation to a site or an action performed within a site). A user might navigate to a website or web page by, for example, clicking a web link, entering a URL into an address bar of the web browser, using the forward or backward icon, using a favorites icon, automatic redirection, etc. One skilled in the art will appreciate that web-browsed data can be obtained in any number of ways. For example, web-browsed data might be obtained by communicating a request to an existing browsing history storage system.

Web-browsed data can be any data associated with web browsing. As such, web-browsed data can include any data related to navigation to or an action performed within a website or webpage. By way of example only, web-browsed data might include a site identifier (e.g., URL or site title) associated with a visited site, an indication as to how a user arrived at a visited site (e.g., an identifier associated with the site referring a user to the visited site, an indication of any redirects, an identifier of the site causing the redirect), an indication of actions performed at a visited site, an indication of the time or time duration a particular site is visited (e.g., a timestamp), a user identifier to identify a user or user device, information regarding the context in which the site was visited (e.g., process), or the like. A site identifier might be a strong site identifier or a weak site identifier. A strong site identifier refers to an identifier that uniquely identifies a site. Accordingly, in embodiments, a strong site identifier is used to identify a site associated with non-private data. Such a strong site identifier might be used so that the site can be uniquely identified and, thereby, more beneficial to providing suggested sites. A strong site identifier might be, for example, a site title, a site URL, a strong hash value, or any other unique representation of a site. A weak site identifier refers to an identifier that provides a collision or clash such that at least two different sites correspond with the same identifier. As such, correlating a weak site identifier with a particular site is difficult. Accordingly, to preserve privacy, weak site identifiers might be used in association with private data, as discussed more fully below. A weak site identifier might be, for example, a weak hash value.

In one embodiment, web-browsed data obtaining component 220 obtains web-browsed data in accordance with an algorithm, an event (e.g., an occurrence of a web browsing activity occurs, enablement of a suggested site feature, etc.), a time, a time duration, or the like. For instance, the web-browsed data obtaining component 220 might obtain web-browsed data upon an occurrence of a web browsing activity when a suggested site feature in association with a web browser is enabled. Enablement of a suggested site feature allows suggested sites to be provided to a user. Such a suggested site feature can be enabled automatically or via a user in any number of ways. By way of example only, to enable a suggested site feature, a user might select to enable the feature by way of a history center, an advanced control, a control panel, a menu bar, etc. In an alternative embodiment, web-browsed data obtaining component 220 might continuously obtain web-browsed data.

Obtained web-browsed data might be stored, for instance, in association with the data store 232. It will be understood and appreciated by those of ordinary skill in the art that the information stored in the data store 232 may be configurable and may include any information relevant to web-browsing activities. Although data store 232 is illustrated in the form of a file, one skilled in the art will appreciate that data store 232 can take on any form of storage, such as a database or the like. The data store 232 accumulates web-browsed data associated with a user or user device. In some embodiments, web-browsed data within the data store 232 might be deleted or removed, for example, based on a user indication (e.g., a user selects to delete data, such as data pertaining to a particular website), an occurrence of an event (e.g., disablement of a suggested site feature), a lapse of a time or time period, or the like. For example, web-browsed data might be stored in the data store 232 for a particular amount of time, such as twenty days, and thereafter removed from the data store 232 (e.g., upon a lapse of the twenty day time period).

Web-browsed data might be stored in association with a user identifier. A user identifier is used to identify a user or a user device. Such a user identifier enables suggested sites to be provided that are unique to a particular user. One skilled in the art will appreciate that a user identifier can be created via a web browser or other component of the user device, a suggestion engine, or any other computing device. In some embodiments, a user identifier is an IP address identifier, a user-generated identifier, such as a login name and/or password, or other identifier recognizably associated with a user or user device. Such user identifiers can have privacy implications. In other embodiments, a user identifier is specifically generated to preserve privacy (i.e., a private user identifier). To preserve privacy, for example, a private user identifier is generated using a globally unique identifier (GUID) and a cryptographic identifier. A GUID (e.g., a sixteen bit GUID) might be generated, in part, using a hardware identifier of a device. A GUID having a strong hash value provides protection from a collision of user identifiers. A cryptographic identifier (e.g., a thirty-two bit cryptographic identifier) can be added to the GUID to enhance the security of the private user identifier. Cryptography can be used to generate a strong, random cryptographic identifier.

A user identifier might be automatically generated or initiated, for example, upon enabling a suggested site feature, upon obtaining web-browsed data associated with a user or user device, upon a user request for a user identifier (e.g., a private user identifier), upon a user request for a suggested site(s), or the like. In embodiments, upon uninstalling or disabling a suggested site feature, a user identifier, such as a private user identifier, associated with a user and/or user device is deleted. After a user identifier is deleted or removed, to maintain privacy, obtained web-browsed data will no longer be associated with the user identifier. In this regard, because web-browsed data might be stored in association with a user identifier at the user device 210 and/or the suggestion engine 212, upon disablement of a suggested site feature, the user identifier and/or related web-browsed data might be deleted or removed from storage. In such an embodiment, upon reinstallation or enablement of the suggested site feature, a new user identifier can be generated.

In some embodiments, to preserve privacy, the web-browsed data obtaining component 220 fails to obtain private data. Private data refers to any data associated with web browsing (i.e., web-browsed data) that is not intended or desired to be recognized. That is, private data is not intended to be shared, for example, in instances that a user is on a shared computer in a home, work environment, or public kiosk. Private data might include any web-browsed data indicated by a user to be deleted or removed from the user's browsing history. In this regard, a user may select to delete all or a portion of the user's browsing history. Alternatively or additionally, private data might include any web-browsed data that results from in-private browsing, as requested by the user. By way of example only, if a user desires to web browse in private, web-browsed data associated with the in-private web browsing might not be obtained by web-browsed data obtaining component 220 and/or locally stored at the user device 210.

In some cases, web-browsed data might initially be obtained by web-browsed data obtaining component 220 and stored within the data store 232. Subsequently, a privacy indication is recognized that provides an indication that the web-browsed data, or a portion thereof, is desired to be private (i.e., private data). A privacy indication might be an indication to delete, remove, or modify data within browsing history (e.g., specific data or all data) or an indication to perform in private browsing. Such a privacy indication might be provided by a user or automatically provided, such as upon an occurrence of an event. For example, web-browsed data might be locally stored before a user selects to delete a URL, or reference thereto, from the browsing history. In such a case, a privacy indication (e.g., the selection to delete the URL) is recognized, and the initially captured web-browsed data, or a portion thereof, within the data store 232 associated with the privacy indication (i.e., private data) can be identified and deleted or modified.

As such, in some cases, web-browsed data, or a portion thereof, stored in the data store 232 that is desired to be private data can be removed or deleted. For example, a site identifier and/or related data that corresponds with data intended to be private can be deleted. Alternatively, web-browsed data, or a portion thereof, stored in data store 232 that is desired to be private (e.g., as indicated by a user-provided privacy indication) can be modified such that the data cannot be readily recognized. In embodiments, a weak site identifier, such as a weak hash value, can be generated and used to replace a strong site identifier (e.g., a URL string) associated with the privacy indication. That is, upon generating a weak hash value, any site identifier for a particular site that is associated with a privacy indication can be replaced with the weak hash value. As a result, the data store 232 contains weak hash values as site identifiers for the sites for which privacy is desired (e.g., a user selects to delete references to URL(s)). By way of example only, assume a user visits website A. A website A strong site identifier and associated data are obtained and locally stored by the user device. Assume that, at a later time, the user selects to delete any representation of website A from the local history. In such a case, a weak hash value can be generated and used to replace each listing of the website A strong site identifier in the data store. The weak hash value provides privacy in that multiple sites might correspond with the weak hash value and, as such, the particular site desired to be private is not recognizable.

One skilled in the art will appreciate that even if web-browsed data stored in the data store 232 has been communicated to the suggestion engine, upon a privacy indication, the web-browsed data associated therewith can be deleted or modified (e.g., strong site identifier replaced with a weak hash value within the data store 232) such that the deletions and/or modifications can be communicated and recognized by the suggestion engine the next occurrence of uploading web-browsed data to the suggestion engine, in association with a request for site suggestions, or the like. As previously discussed, such data can be uploaded to the suggestion engine immediately or might not be uploaded until an expiration of a time period.

The web-browsed data communicating component 222 is configured to communicate web-browsed data to the suggestion engine 212. In embodiments, web-browsed data is communicated to the suggestion engine 212 in association with a user identifier. Web-browsed data communicated to the suggestion engine 212 might be all of the data or a portion of the data stored within the data store 232. For example, in one embodiment, the web-browsed data communication component 222 communicates all the web-browsed data stored within the data store 232. Alternatively, the web-browsed data communicating component 222 communicates a portion of the web-browsed data within the data store 232 to the suggestion engine 212, such as any data updates (e.g., new data, modified data, or an indication of deleted data) within the data store 232. Such data updates might include web-browsed data added to the data store 232, modified within the data store 232, or deleted from the data store 232 since the last time web-browsed data was communicated to the suggestion engine 212.

In embodiments, web-browsed data communicating component 222 communicates web-browsed data in accordance with an algorithm, an event (e.g., an occurrence of a web-browsing activity), a time(s), a lapse of a time duration, etc. For example, web-browsed data might be periodically communicated (e.g., every three hours). By way of further example, web-browsed data might be communicated each instance a user navigates to a website or web page. Alternatively, web-browsed data communicating component 222 might continuously communicate such web-browsed data to the suggestion engine 212.

The indication receiving component 224 is configured to receive an indication to provide one or more suggested sites. Such an indication might be automatically provided, for example, based on an occurrence of an event (e.g., navigating to a site), upon a lapse of a time or time duration (e.g., periodically provided), or the like. Alternatively, an indication to provide suggested sites might be provided by a user. A user might provide such an indication, for example, by selecting a suggested site indicator or navigating to a website or webpage that provides suggested sites (e.g., entering a URL into an address bar or linking thereto). A suggested site indicator refers to any indicator (e.g., icon, button, etc.) that, if selected, results in one or more suggested sites being presented to a user. Such a suggested site indicator might be accessed via a tool bar, a favorites bar, or the like.

The request generating component 226 is configured to generate a suggested site request. A suggested site request (e.g., a http request) provides a request for one or more suggested sites. Such a request provides the suggestion engine 212 with an indication to provide one or more suggested sites. In embodiments, the request generating component 226 generates a suggested site request upon the indication receiving component 224 receiving an indication to provide one or more suggested sites. For example, the request generating component 226 might generate a suggested site request in response to a user-provided indication to receive suggested sites. In another embodiment, the request generating component 226 generates a suggested site request in accordance with an algorithm, a lapse of a time, a time duration, an occurrence of an event, etc. For instance, the request generating component 226 might periodically or continuously generate a request for suggested sites.

In addition to indicating a desire to receive one or more suggested sites, a suggested site request can include web-browsed data. The web browsed data might be contained within a header portion or payload portion of a suggested site request packet. In embodiments, such web-browsed data communicated in the suggested site request can be used by the suggestion engine 212 to provide suggested sites. In some cases, the web-browsed data contained in a suggested site request includes data that has yet to be communicated to the suggestion server. For example, in instances that obtained web-browsed data is periodically communicated to the suggestion engine via the web-browsed data communicating component 222, at least a portion of the web-browsed data might not have been communicated to the suggestion engine prior to a user's request for suggested sites. As such, such web-browsed data might be communicated to the suggestion engine via a suggested site request. In other cases, although web-browsed data has been communicated to the suggestion engine via the web-browsed data communicating component 222, web-browsed data might nonetheless be communicated to the suggestion engine via the a request packet. For example, web-browsed data contained in the suggested site request might reduce the amount of data required to be analyzed or looked up in the data store of the suggestion engine and, as such, enable the suggestion engine 212 to more quickly provide suggested sites.

Web-browsed data included within a suggested site request might include, for example, a user identifier, an indication of target sites (e.g., target site identifiers), an indication of private data, and the like. An indication of one or more target sites enables the suggestion engine 212 to readily recognize target sites for which suggested sites are desired. A target site might be, for example, a recently visited site, a commonly visited site, a currently visited site, or the like. As such, by way of example and not limitation, a suggested site request might include web-browsed data that indicates the five most recently visited sites. In such a case, the suggestion engine 212 can identify one or more suggested sites for each of the five most recently visited sites indicated in the suggested site request. In embodiments, a suggested site request might exclude any recently or frequently visited sites as target sites in instances where such sites are identified as private data (e.g., a user selects to delete such sites from browsing history). A currently visited site might be, for example, a site that has a current focus. For example, in instances where multiple browser sessions are opened with multiple tabs for various sites, the currently visited site can be the browser instance that has the current focus. One skilled in the art will appreciate that a request might include any number of target sites.

A user identifier allows the suggestion engine 212 to associate the suggested site request for suggested sites and web-browsed data included therein with web-browsed data stored in the data store 248 of the suggestion engine such that suggested sites can be uniquely provided to the requesting user. One skilled in the art will appreciate that a user identifier may assist the suggestion engine 212 in identifying target sites and/or suggested sites. For example, upon receiving a user identifier, the suggestion engine 212 might be able to reference data associated therewith to identify or determine one or more target sites comprising most recently visited sites or most frequently visited sites of the user. Alternatively or in addition to, upon receiving a user identifier, the suggestion engine 212 might be able to reference data associated therewith to identify suggested sites based on sites the user has frequently or recently visited. By way of example only, assume that the data store 248 contains web-browsed data associated with a plurality of web browser users. In such a case, the user identifier enables the suggestion engine 212 to reference web-browsed data stored in the data store 248 with the requesting user. Such data associated with the user can be used to identify suggested sites.

An indication of private data enables the suggestion engine 212 to maintain user privacy. Because web-browsed data is not, in some embodiments, communicated to the suggestion engine 212 via the web-browsed data communicating component 222 in real time, providing an indication of private data within a suggested site request enables such information to be timely communicated to the suggestion engine 212 so that user privacy can be preserved, as discussed more fully below. Accordingly, the suggestion engine 212 can avoid providing suggested sites for a site recently deleted from browsing history and/or using a recently deleted site to provide suggestions for a target site. Private data might include, by way of example, and not limitation, any web-browsed data indicated by a user to be deleted, removed, or modified within the user's browsing history or any web-browsed data that results from in-private browsing, as requested by a user.

In one embodiment, a suggested site request includes recently-indicated private data, such as recent browsing history deletes. That is, a suggested site request might include private data, or an indication thereof, recently indicated as such. Accordingly, a suggested site request might include an indication of a user's recent deletes (e.g., URLs, or references thereto, recently deleted from the browsing history). For example, a suggested site request can include a set of site identifiers, such as strong or weak site identifiers (e.g., weak hash values) that correspond with one or more sites a user has deleted or requested to delete from browsing history since the last time web-browsed data was communicated to the suggestion engine via the web-browsed data communicating component 222. Including recently-indicated private data within a suggested site request ensures that the suggestion engine 212 receives such data despite the data not yet being uploaded via the web-browsed data communicating component 222. In some cases, a large amount of recent private data might exist. In such a case, the suggested site request might provide an indication as such (e.g., a general delete request) so that all web-browsed data associated with a user is removed from the data store of the suggestion engine 212. Alternatively, the suggested site request might provide an indication as such so that the site suggestions are modified accordingly with respect to that particular suggested site request, but does not affect the web-browsed data within the data store of the suggestion engine 212.

To preserve user privacy and prevent malicious obtaining of user data, one skilled in the art will appreciate that, in some embodiments, a suggested site request is not generated and/or communicated prior to receiving an indication to proceed with communicated data. As such, in embodiments, a function (e.g., a java script function) can be implemented that can be used by any website provider. Upon a user request for suggested sites, such a function only enables web-browsed data to be communicated to a particular website or website provider dedicated to providing suggested sites. This prevents user data from being transmitted to malicious users.

By way of example only, assume a user provides an indication of a desire to receive suggested sites (e.g., selects a suggested site indicator or enters a website URL dedicated to providing suggested sites into an address bar). Such a request results in a presentation of a static webpage. However, in some embodiments, user data, such as a private header containing a user identifier, target sites, and/or private data, has not yet been communicated, for example, depending on the mechanism by which a user indicates a desire to receive suggested sites. If it is recognized that personal user data, such as private headers, have not been communicated, in response, a function (e.g., a java script function) is executed at the user device. For example, the rendered static webpage might include a call to a java script function. The function requests or identifies web-browsed data associated with the user (e.g., web-browsed data stored in the data store 232) and initiates communication of the web-browsed data to the suggestion engine 212 such that the web-browsed data can be used to provide customized suggested sites. That is, the web-browsed data is directed to a particular computing device or entity. In embodiments, the web-browsed data is communicated to the suggestion engine 212 in association with a second rendering of the webpage. In instances where a malicious user employs the function such that the function is executed at the user device, the function only enables navigation to the particular website or website provider dedicated to providing suggested sites. In this regard, web-browsed data associated with the user is transmitted to the preferred computing device or entity regardless of the entity utilizing the function.

The request communicating component 228 communicates requests to the suggestion engine 212. In embodiments, the request communicating component 228 communicates a suggested site request upon a suggested site request being generated by request generating component 226. The suggested site request can provide the suggestion engine with an indication of desired suggested sites and can provide web-browsed data for use by the suggestion engine in providing suggested sites to the requesting user device.

The suggested site presenting component 230 is configured for presenting (e.g., displaying) suggested sites. In embodiments, suggested sites are displayed in association with target sites to a user. In this regard, the suggested site presenting component 230 is configured for receiving the suggested sites (and/or the target sites in association with which the suggested sites) from the suggestion engine 212. The suggested site presenting component 230 may present the suggested sites utilizing a variety of different user interface components, several of which are described more fully below. In some embodiments, suggested sites are presented without any association to a target site, as discussed more fully below.

As shown in FIG. 2, the suggestion engine 212 of system 200 includes a web-browsed data receiving component 240, a request receiving component 242, a suggested site identifying component 244, a suggested site communicating component 246, and a data store 248. In some embodiments, one or more of the illustrated components 240, 242, 244, 246, and 248 may be implemented as stand-alone applications. In other embodiments, one or more of the illustrated components 240, 242, 244, 246, and 248 may be integrated into the operating system of the user device 210 and/or the suggestion engine 212 or integrated into the web browser of the user device 210. It will be understood by those of ordinary skill in the art that the components 240, 242, 244, 246, and 248 illustrated in FIG. 2 are exemplary in nature and in number and should not be construed as limiting. Any number of components may be employed to achieve the desired functionality within the scope of embodiments of the present invention.

The web-browsed data receiving component 240 receives web-browsed data communicated from the user device 210 (e.g., the web-browsed data communicating component 222). As previously discussed, such web-browsed data might include, for example, site identifiers associated with visited sites, an indication as to how a user arrived at each visited site, an indication of actions performed at each visited site, an indication of the time or time duration each particular site is visited (e.g., a timestamp), a user identifier to identify a user or user device, or the like. In embodiments where the web-browsed data communicating component 222 communicates web-browsed data periodically, the web-browsed data receiving component 240 might similarly receive the web-browsed data periodically.

Upon receiving web-browsed data, such data might be stored, for instance, in association with a data store 248. Although data store 248 is shown in the form of a database, the data store 248 can take on any form of storage including, for example, a file. It will be understood and appreciated by those of ordinary skill in the art that the information stored in the data store 248 may be configurable and may include any information relevant to any web browsing activity. The data store 248 can accumulate web-browsed data over a period of time, such as a predetermined period of time, a dynamically determined period of time, a period of time associated with an event, or the like. Accordingly, the data store 248 can include long-term user browsing history. In some embodiments, web-browsed data within the data store 248 might be deleted or removed, for example, based upon receiving a user indication (e.g., a user selects to delete data, such as data pertaining to a particular website), an occurrence of an event (e.g., disablement of a suggested site feature), a lapse of a time or time period, or the like. For example, web-browsed data might be stored in the data store 248 for a particular amount of time, such as eighteen months, and, thereafter, removed from the data store 248 (e.g., upon a lapse of the eighteen month time period).

In one embodiment, the data store 248 might store web-browsed data associated with a particular user. Alternatively, the data store 248 might store web-browsed data associated with a plurality of users (e.g., a set of users, all web-browser users, etc.). Such web-browsed data stored within the data store 248 might be stored in association with a user identifier, such as a private user identifier, so that the web-browsed data can be used at a later time to provide suggested sites for a particular user. The web-browsed data received and stored by the suggestion engine 212 can be utilized to provide users with suggested sites in association with target sites, as discussed more fully below.

The request receiving component 242 receives requests communicated from the user device 210. In embodiments, the request receiving component 242 receives suggested site requests that are communicated to the suggestion engine 212 in response to user indications to provide one or more suggested sites. As previously mentioned, the suggested site requests might include web-browsed data such as, for example, a user identifier, a target site(s), private data, and the like. In some embodiments, the web-browsed data, or a portion thereof, contained within a suggested site request is extracted and/or stored, for instance, in the data store 248 in association with the user identifier. Such web-browsed data might be used to update the data store 248. In this regard, web-browsed data might be added to or deleted from the data stored in the data store 248 or replace or modify the web-browsed data stored therein.

For example, in some embodiments, a suggested site request includes an indication of private data (e.g., an indication of URLs recently deleted from the browser history). Strong site identifiers or a weak site identifiers might be used in a suggested site request to provide an indication of the data intended to be private, such as recent deletes. In embodiments where strong site identifiers are used to indicate private data, the suggestion engine 212 might identify any matching site identifiers in the data store 248 that are associated with the user and remove such identifiers and/or related data. That is, any matching site identifier listed in the data store 248 and/or related data might be deleted from the data store 248. Alternatively, for any matching site identifier listed in the data store 248, a weak site identifier might be generated and used to replace any corresponding strong site identifiers included in the data store 248. In embodiments where weak site identifiers are used to indicate private data, the suggestion engine 212 might identify any sites within the data store 248 associated with the weak site identifiers and remove such identifiers and/or related data or replace the existing site identifier with the weak site identifier. As multiple sites can be associated with a single weak site identifier, a suggested site request having a weak site identifier to indicate a recently delete might result in the removal or replacement of more than one corresponding strong site identifier in the data store 248. For example, assume a weak site identifier is associated with website A and website B. In such a case, the weak site identifier might be used to replace any reference to website A as well as any reference to website B.

The suggested site identifying component 244 is configured to identify suggested sites. In embodiments, the suggested site identifying component 244 identifies suggested sites using web-browsed data, such as web-browsed data stored in the data store 248 and/or web-browsed data contained within the received suggested site request. The suggested site identifying component 244 might extract web-browsed data contained within the received request. Such web-browsed data might include, for example, a user identifier, an indication of one or more target sites, an indication of private data, or the like.

In one embodiment, to identify suggested sites, the suggested site identifying component 244 identifies one or more target sites for which suggested sites are desired. Such target sites can be identified based on web-browsed data provided within the suggested site request. For example, the suggested site request might include a set of one or more recently visited sites as target sites. In such cases, the target site data might be extracted from the suggestion site request communicated to the suggestion engine 212 or the data store 248 if stored therein. Alternatively, target sites can be identified (e.g., determined or referenced) using web-browsed data stored within the data store 248. For example, one or more sites most commonly visited can be identified as target sites using the user identifier communicated in the request and the web-browsed data stored in the data store 248. The user identifier enables corresponding data stored with the data store 248 to be referenced. A user identifier is used so that personalized suggestions can be provided to the user.

Upon identifying one or more target sites for which suggested sites are desired, the suggested site identifying component 244 might identify (e.g., determine or reference) suggested sites in association with each target sites. In one embodiment, the suggested site identifying component 244 might use aggregated web-browsed data associated with the user or a plurality of users that is stored in the data store 248 to dynamically determine one or more suggested sites for each target site. Alternatively, suggested sites for target sites might have previously been determined and, in such a case, the suggested site identifying component 244, can reference site identifiers of sites deemed similar to or related to each of the target sites. For example, in embodiments, the suggestion engine 212 compares the user's history of visited sites to other users and creates a list of related URLs for each URL in the user's history. In such a case, upon identifying the target sites, the pre-generated list of related URLs can be referenced. Even in cases where suggested sites are determined in advance, such suggested sites can be modified, for example, continuously or periodically, as new data is received from the user and/or other browser users. One skilled in the art will appreciate that any algorithm or lookup table can be used to identify suggested sites for a target site.

In addition to using web-browsed data stored in data store 248 to identify suggested sites, suggested site identifying component 244 can also use web-browsed data extracted from the suggested site request. For example, private data contained within the request can be used by the suggested site identifying component 244 to avoid providing suggested sites for a recently deleted site and/or avoid using a recently deleted site to provide suggestions for a target site. By way of example only, assume the five most commonly viewed URLs are used as the target sites. Upon identifying such target sites (e.g., indicated in the suggested site request or determined using web-browsed data stored in the data store 248), an indication of private data within the suggested site request can be referenced to identify whether any of the target sites are listed as private data. In such a case where a most commonly viewed target site is indicated as private data, suggested sites are not presented for that URL.

In an alternative embodiment, the suggested site identifying component 244 identifies one or more suggested sites that are more general to a user. For example, in some cases, web-browsing historical data might not exist or might exist in a small amount. In other cases, site suggestions might not exist, or might exist in a small amount, that are related or similar to a site(s) visited by a user. In either case, among others, generic site suggestions might be identified and provided to a user. Such generic site suggestions can be based on, for example, popular sites for other similar users or popular sites for the general population. Similar users might be based on other users having a similar geographical location(s), a similar spoken language(s), a similar interest(s), a similar age, a combination thereof, or other similar characteristic or interest.

The suggested site communicating component 246 is configured to communicate suggested sites to the user device 210 that requested the suggested sites. In embodiments, the suggested site communicating component 246 can communicate the suggested sites upon the suggested site identifying component 246 identifying one or more suggested sites. In some cases, the suggested site communicating component 246 might also retrieve or obtain and provide the user device with other information associated with the suggested sites for use in rendering the suggested sites to the user. By way of example only, the suggested site communicating component 246 might communicate titles, captions, icons, target sites in association with the suggested sites, or the like.

Figure 3:
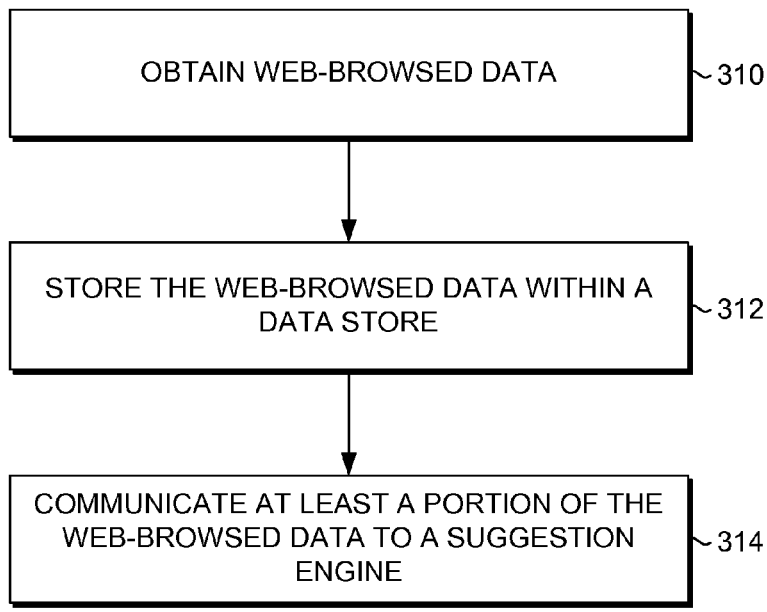
FIG. 3 is a flow diagram showing a method for providing web-browsed data to a suggestion engine to facilitate providing suggested sites, in accordance with an embodiment of the present invention.

Turning now to FIG. 3, a flow diagram is illustrated which shows a method 300 for providing web-browsed data to a suggestion engine to facilitate providing suggested sites, in accordance with an embodiment of the present invention. Initially, at block 310, web-browsed data is obtained. In embodiments, web-browsed data is obtained in response to a user performing a web browsing activity, such as navigating to a website or web page. The web-browsed data might include any data associated with any web browsing activity, such as, for example, a user identifier, a site identifier, a time stamp, and the like. Subsequently, at block 312, the web-browsed data is stored within a data store, such as a file. In instances where data stored within the data store is later indicated as private data, the web-browsed data within the data store can be updated in accordance therewith. For example, in some embodiments, any data indicated as private data is removed from the data store. In an alternative embodiment, a strong site identifier in the data store that is associated with private data is replaced with a weak site identifier such that site cannot be identified. At block 314, web-browsed data stored within the data store, or a portion thereof, is communicated to a suggestion engine. Such web-browsed data might be communicated to the suggestion engine periodically. The suggestion engine can, thereafter, utilize the web-browsed data to provide suggested sites in association with target sites. In some embodiments, the web-browsed data is not stored within a data store, but rather is communicated to a suggestion engine in real-time.

Figure 4:
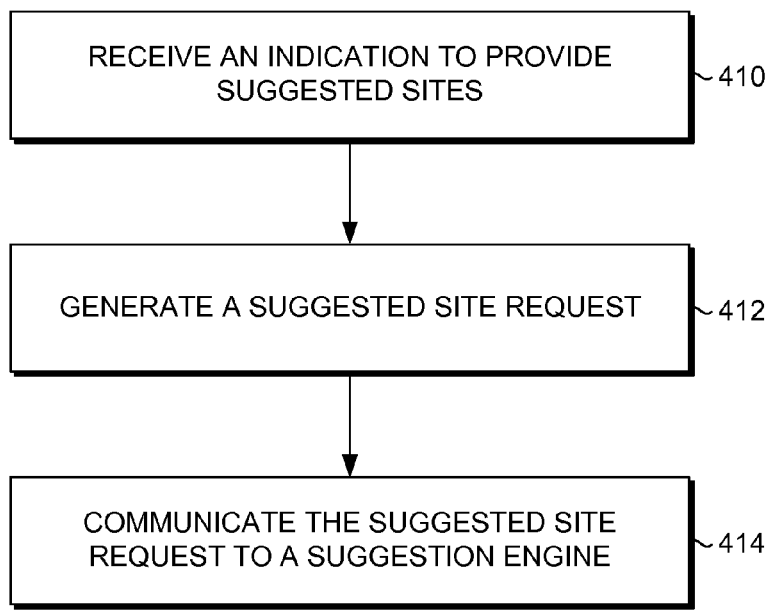
FIG. 4 is flow diagram showing a method for providing web-browsed data to a suggestion engine via a suggested site request to facilitate providing suggested sites, in accordance with an embodiment of the present invention.

With reference to FIG. 4, a flow diagram is illustrated which shows a method 400 for providing web-browsed data to a suggestion engine via a suggested site request to facilitate providing suggested sites, in accordance with an embodiment of the present invention. Initially, as indicated at block 410, an indication to provide suggested sites is received. In embodiments, such an indication is provided by a user requesting to be presented with suggested sites. Subsequently, at block 412, a suggested site request is generated. The suggested site request provides an indication of a desire to receive suggested sites. The suggested site request might also include web-browsed data, such as web-browsed data that has not been previously uploaded to a suggestion engine or, in some cases, web-browsed data that has previously been uploaded to the suggestion engine. Such web-browsed data might include, for example, a user identifier, a set of one or more target sites for which suggested sites are desired, and/or private data (e.g., a set of one or more recently deleted sites). The suggested site request is communicated to a suggestion engine. This is indicated at block 414.

Figure 5:
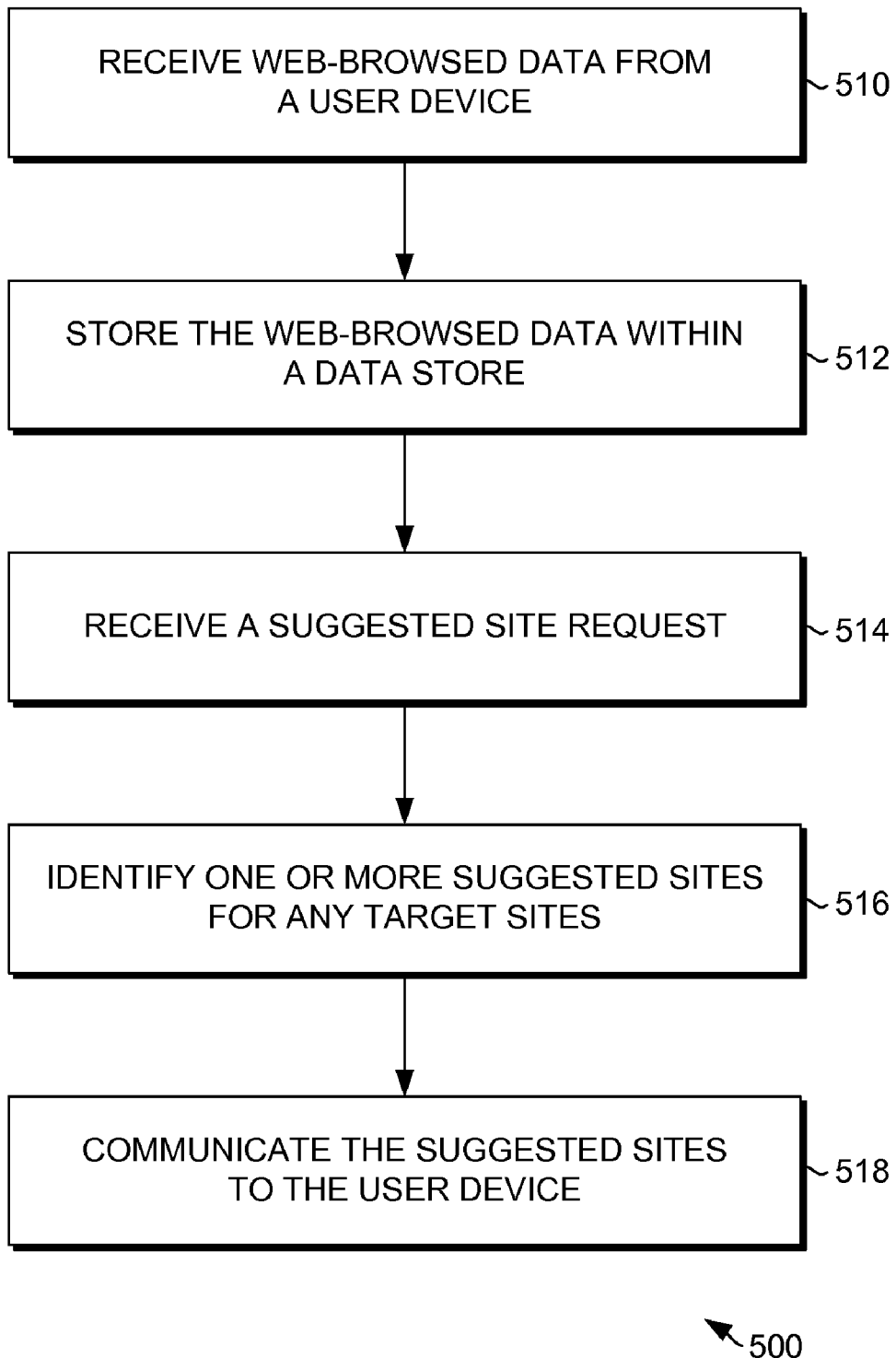
FIG. 5 is a flow diagram showing a method for providing suggested sites, in accordance with an embodiment of the present invention.

Turning now to FIG. 5, a flow diagram is illustrated which shows a method 500 for providing suggested sites, in accordance with an embodiment of the present invention. Initially, as indicated at block 510, web-browsed data is received from a user device. The web-browsed data might include any data associated with any web browsing activity, such as, for example, a user identifier, a site identifier, a time stamp, and the like. Such web-browsed data might be received periodically. Subsequently, at block 512, the web-browsed data is stored within a data store. At block 514, a suggested site request indicating a desire for one or more suggested sites is received. The suggested site request might include, for example, web-browsed data, such as recent web-browsed data not previously uploaded to the suggestion engine. Such web-browsed data contained within the suggested site request might include a user identifier, one or more target sites, and/or private data (e.g., a set of one or more recently deleted sites).

Thereafter, at block 516, one or more suggested sites are identified for any target sites. In embodiments, the suggested sites are identified using long-term web-browsed data stored within the data store, such as web-browsed data associated with the requesting user or associated with a set of users, and using the recent web-browsed data contained within the received suggested site request. In embodiments, target sites are identified prior to identifying suggested sites for each of the target sites. Such target sites might be indicated in the suggested site request or identified using the long-term web-browsed data stored within the data store. The suggested sites are communicated to the requesting user device. This is indicated at block 518. The suggested sites received by the user device can be presented in association with the corresponding target sites via a display screen.

Figure 6:
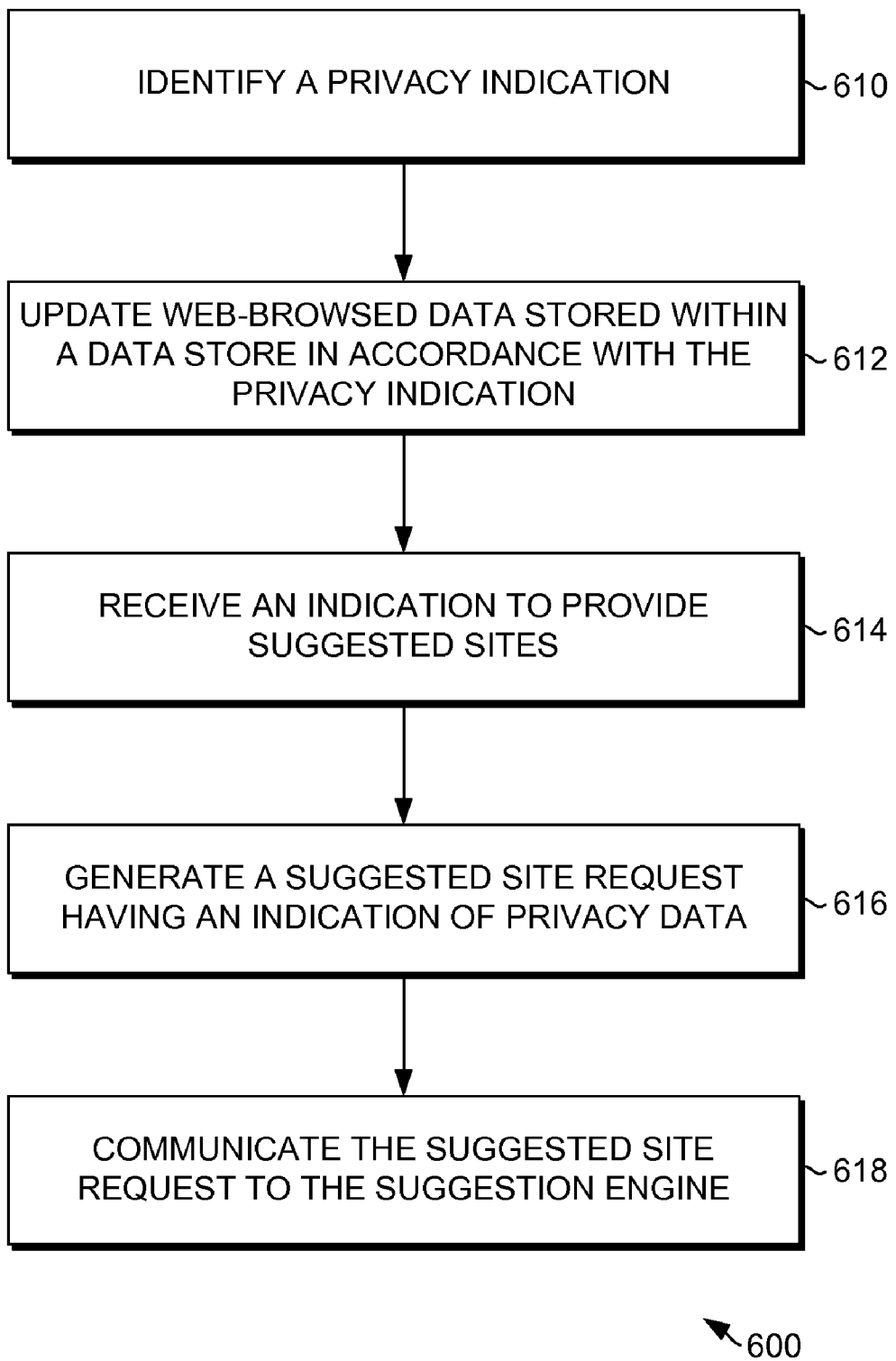
FIG. 6 is a flow diagram showing a method for providing suggested sites while maintaining user privacy, in accordance with an embodiment of the present invention.

Turning now to FIG. 6, a flow diagram is illustrated which shows a detailed method 600 for providing suggested sites while maintaining user privacy, in accordance with an embodiment of the present invention. Initially, as indicated at block 610, a privacy indication is identified. Such a privacy indication provides an indication that web-browsed data, or a portion thereof, is desired to be private. For example, a privacy indication might be recognized in instances where a user selects to delete data from the browsing history. At block 612, web-browsed data stored within a data store of a user device is updated in accordance with the privacy indication. As such, web-browsed data associated with the privacy indication might be deleted from the data store or modified within the data store (e.g., replace a strong site identifier with a weak site identifier). At block 614, an indication to provide suggested sites is received. Such an indication might be provided by a user that desires to view suggested sites for one or more target sites. Thereafter, at block 616, a suggested site request is generated to request one or more suggested sites. The suggested site request includes, among other things, an indication of private data, such as recent private data that has not been previously uploaded to the suggestion engine and stored within the data store of the suggestion engine. Such private data might include, for example, a site identifier of a site recently deleted from the browsing history. The site identifier might be a weak site identifier (e.g., a weak hash value) and, as such, might be generated prior to inclusion within the suggested site request. The suggested site request is communicated to, and received by, the suggestion engine. This is indicated at block 618.

Upon receiving the suggested site request, the suggestion engine can update the data store containing long-term web-browsed data using the private data included within the request. That is, web-browsed data included within the data store that is desired to be private might be deleted or modified (e.g., converted to a weak site identifier). In some cases, as a weak site identifier might be associated with multiple websites, more data than that initially indicated as private data might be effected. If the suggested site request includes a single delete command, for example, in instances where more outstanding deletes exist than can be sent via the suggested site request, the suggestion engine might delete all data or at least site identifiers within the data store of the suggestion engine. Alternatively, the private data within the suggested site request might be used in generate suggested sites as requested in accordance with the private data, but does not affect the web-browsed data within the data store of the suggestion engine. The private data contained within the suggested site request can be used by the suggestion engine to identify target sites and/or suggested sites in accordance with the communicated private data.

It will be understood by those of ordinary skill in the art that the order of steps shown in the method 300 of FIG. 3, the method 400 of FIG. 4, the method 500 of FIG. 5, and the method 600 of FIG. 6 are not meant to limit the scope of the present invention in any way and, in fact, the steps may occur in a variety of different sequences within embodiments hereof. Any and all such variations, and any combination thereof, are contemplated to be within the scope of embodiments of the present invention.

Figure 7:
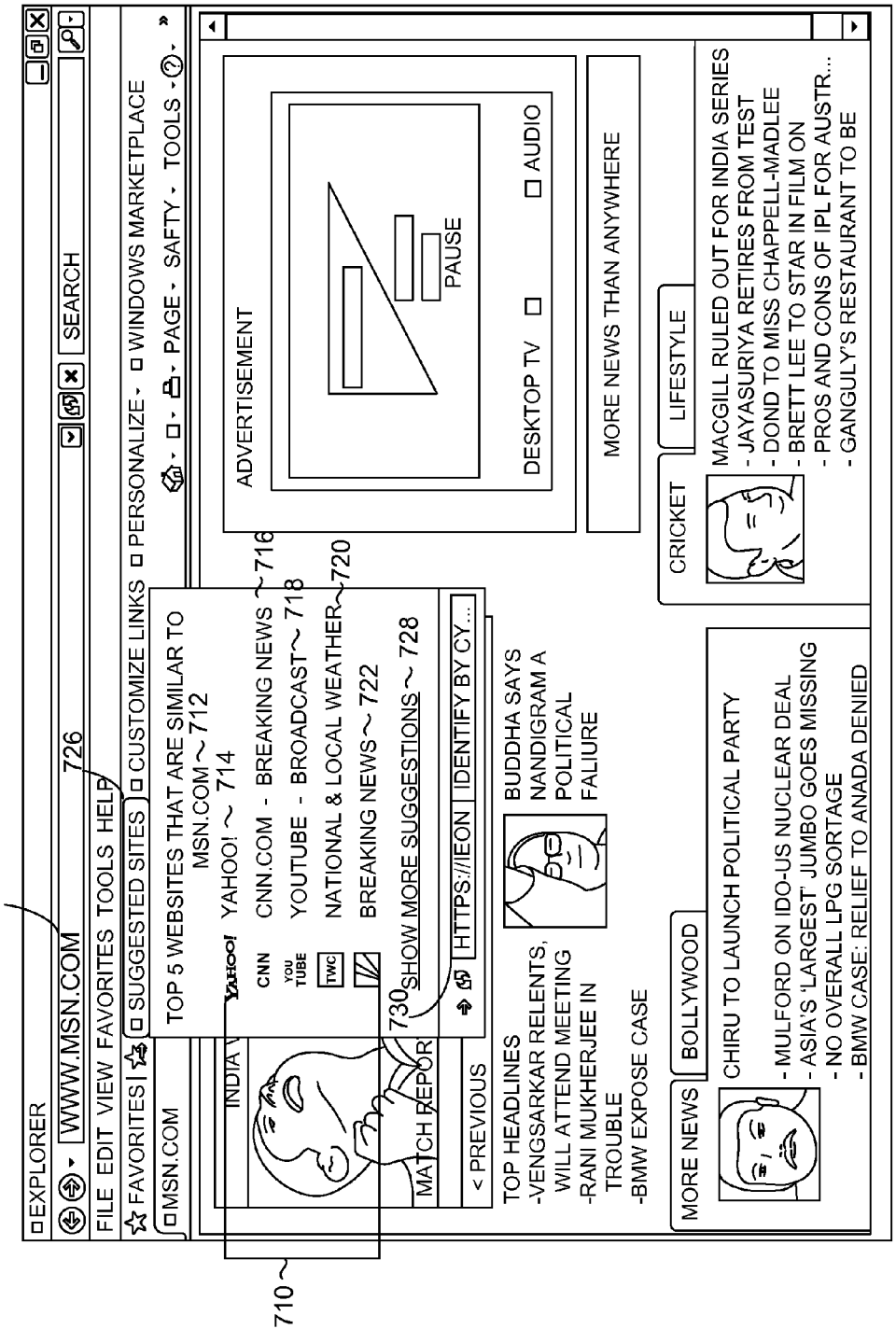
FIG. 7 is a first illustrative screen display of an exemplary user interface illustrating a presentation of suggested sites in association with a target site, in accordance with an embodiment of the present invention.
Figure 8:
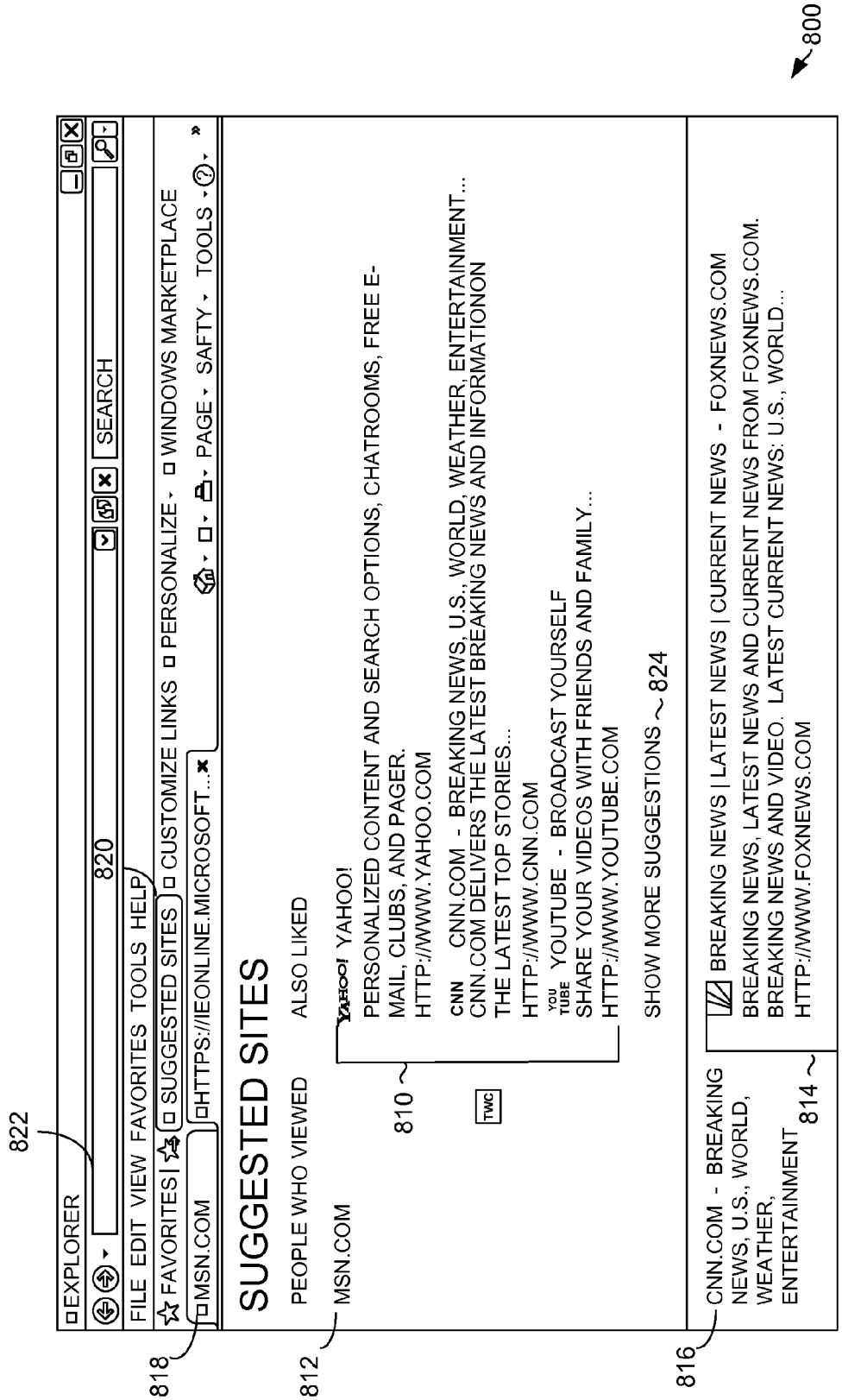
FIG. 8 is a second illustrative screen display of an exemplary user interface illustrating a presentation of suggested sites in association with target sites, in accordance with an embodiment of the present invention.

As previously mentioned, suggested sites may be presented in any number of ways including, without limitation, suggested sites presented in connection with a website or web page being viewed as shown in FIG. 7 or suggested sites presented in connection with a website or web page dedicated to providing suggested sites as shown in FIG. 8. It will be understood by those of ordinary skill in the art that a number of other user interface features may be utilized to expose and/or present suggested sites in accordance with embodiments hereof and that user interface features shown in FIGS. 7-8 are meant to be merely illustrative of some such features. Any and all such variations are contemplated to be within the scope of embodiments hereof. In embodiments, a web browser in association with a user device enables a user to display and interact with suggested sites. Accordingly, a web browser has the capability to present suggested sites in association with one or more target sites to a user. Examples of web browsers include Microsoft® Internet Explorer®, Mozilla® Firefox®, Netscape®, etc.

Suggested sites in association with target sites can be presented in connection with a website or web page being viewed. An example of this user interface feature is shown in FIG. 7. With reference to FIG. 7, an illustrative screen display is shown, in accordance with an embodiment of the present invention, of an exemplary user interface 700 showing a set of suggested sites 710 in association with a target site 712. The set of suggested sites 710 includes five suggested sites 714, 716, 718, 720, and 722. One skilled in the art will appreciate that any number of suggested sites can be presented. In illustrative screen display 700, the target site 712 matches the website currently being viewed 724. As one skilled in the art will appreciate, however, the target site 712 and corresponding set of suggested sites 710 might correspond with another target site, such as a website previously visited or most commonly visited. In addition, although illustrative screen display 700 displays a set of suggested sites 710 for only one target site 712, any number of target sites and corresponding suggested sites can be presented.

In one embodiment, the set of suggested sites 710 and corresponding target site 712 are presented upon a user providing an indication of a desire to view suggested sites. As such, a user might select a suggested site indicator 726 to view the set of suggested sites 710. One skilled in the art will appreciate that the suggested sites might be continuously presented, for example, adjacent to the web page or website being viewed. As shown in FIG. 7, a user has an option to view more suggested sites, for example, by selecting a "Show More Suggestions" indicator 728. By selecting such an indicator 728, more suggested sites associated with that target site(s) might be presented. Additionally or alternatively, more target sites and associated suggested sites might be provided.

Suggested sites in association with target sites can be presented in connection with a website or web page dedicated to providing suggested sites. An example of this user interface feature is shown in FIG. 8. With reference to FIG. 8, an illustrative screen display is shown, in accordance with an embodiment of the present invention, of an exemplary user interface 800 showing a first set of suggested sites 810 in association with a first target site 812 and a portion of a second set of suggested sites 814 in association with a second target site 816. One skilled in the art will appreciate that any number of suggested sites and/or target sites can be presented. In illustrative screen display 800, the target site 812 matches the website most recently viewed 818 while the target site 816 represents another recently viewed website or a commonly viewed website. As one skilled in the art will appreciate, however, the target sites 812 and 816 might correspond with any target site, such as a website previously visited or most commonly visited. In addition, although illustrative screen display 800 displays a set of suggested sites for two target sites, any number of target sites and corresponding suggested sites can be presented.

In one embodiment, the suggested sites are presented upon a user providing an indication to view suggested sites. As such, a user might select the suggested site indicator 820 to view the suggested sites, the "Show More Suggestions" indicator 728 of FIG. 7, or a link 730 of FIG. 7 to a website or web page dedicated to providing suggested sites. Alternatively, a user can enter a URL into the address bar 822, or link thereto, to arrive at a website or web page dedicated to providing suggested sites. A user has an option to view more suggested sites, for example, by selected a "Show More Suggestions" indicator 824 of FIG. 8. By selecting such an indicator 824, more suggested sites associated with that target site(s) might be presented.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media having computer-executable instructions embodied thereon for performing a method that facilitates providing suggested sites in association with target sites, the method comprising:
   obtaining web-browsed data associated with web browsing activities of a user, the web-browsed data including at least one site identifier that identifies a web-browsed website;
   storing the web-browsed data in association with a user identifier that identifies a user or a user device corresponding with the web browsing activities;
   recognizing at least a portion of the web-browsed data that the user intends to be private data and, in accordance therewith, generating a weak site identifier and replacing the stored site identifier associated with the private data with the weak site identifier; and
   communicating the stored web-browsed data to a suggestion engine that provides at least one suggested website that is similar to a target website viewed by a user, wherein the web-browsed data is used to identify the at least one suggested website for the target website viewed by the user.

2. The one or more computer storage media of claim 1, wherein the user identifier is a private user identifier automatically generated using a globally unique identifier and a cryptographic identifier.

3. The one or more computer storage media of claim 1 further comprising deleting the stored site identifier associated with the private data.

4. The one or more computer storage media of claim 1, wherein the suggestion engine stores the web-browsed data in a database in association with the user identifier.

5. The one or more computer storage media of claim 1, wherein the web-browsed data received by the suggestion engine is used in combination with recent web-browsed data communicated to the suggestion engine via a suggested site request upon a user providing an indication to receive suggested sites to provide the at least one suggested website for the target website.

6. The one or more computer storage media of claim 1 wherein the web-browsed data is obtained when a suggested site feature is enabled based on a user request.

7. The one or more computer storage media of claim 1 further comprising:
   receiving an indication from the user to provide the at least one suggested website;
   generating a suggested site request that includes a set of recently visited websites and a set of recently deleted websites; and
   communicating the suggested site request to the suggestion engine, wherein the set of recently visited websites and the set of recently deleted websites are used to determine the at least one suggested website for the target website.

8. A computerized method to facilitate providing suggested sites in association with target sites, the method comprising:
   receiving web-browsed data associated with web browsing activities of a user, the web-browsed data including a plurality of site identifiers that identify web-browsed websites, wherein at least one of the plurality of site identifiers comprises a strong site identifier for non-private data and at least one of the plurality of site identifiers comprises a weak site identifier for private data;
   storing the web-browsed data in a data store in association with the user;
   receiving recent web-browsed data associated with the user via a suggested website request that requests one or more suggested websites, the recent web-browsed data including at least one target website viewed by the user;
   using the received at least one target website and the received web-browsed data to identify the one or more suggested websites in association with each of the at least one target websites, the one or more suggested websites being related or similar to the corresponding target website; and
   presenting the one or more suggested websites in association with the corresponding target website.

9. The computerized method of claim 8, wherein the web-browsed data is periodically communicated from a user device.

10. The computerized method of claim 8, wherein the recent web-browsed data is received from a user device associated with the user in response to the user requesting to view the one or more suggested websites.

11. The computerized method of claim 8, wherein the recent web-browsed data includes an indication of private data.

12. The computerized method of claim 11, wherein the recent web-browsed data is used to update the web-browsed data stored in the data store.

13. The computerized method of claim 8, wherein the at least one target website comprises at least one recently viewed website, at least one frequently viewed website, or a combination thereof.

14. The computerized method of claim 8, wherein the one or more suggested websites are presented in connection with a website being currently viewed by the user.

15. The computerized method of claim 8, wherein the one or more suggested websites are presented in connection with a website or web page dedicated to providing the suggested websites.

16. The computerized method of claim 8, wherein the data store is used to store web-browsed data associated with a plurality of users.

17. One or more computer storage media having computer-executable instructions embodied thereon for performing a method that facilitates providing suggested sites in association with target sites, the method comprising:

receiving web-browsed data associated with web browsing activities of a plurality of web browser users, the web-browsed data including site identifiers that identify web-browsed website or webpages, wherein at least one of the site identifiers comprises a strong site identifier for non-private data and at least one of the site identifiers comprises a weak site identifier for private data;

storing the web-browsed data in a data store in association with a user identifier;

receiving a suggested site request communicated from a user device in response to a user providing an indication of a desire to view one or more suggested sites, the suggested site request including recent web-browsed data associated with the user, wherein the recent web-browsed data includes a user identifier associated with the user or the user device, one or more target sites comprising recently viewed sites, and an indication of one or more recently deleted sites;

identifying one or more suggested sites that correspond with each of the one or more target sites, the one or more suggested sites being related or similar to the corresponding target site, wherein the web-browsed data stored in the data store and the recent web-browsed data communicated in the suggested site request are utilized to identify the one or more suggested sites for each corresponding target site; and presenting to the user the one or more suggested sites in association with the corresponding target site.

* * * * *